ns011858369B2

(12) United States Patent
Books

(10) Patent No.: US 11,858,369 B2
(45) Date of Patent: Jan. 2, 2024

(54) SYSTEMS, APPARATUSES, AND METHODS FOR CHARGING MULTIPLE VEHICLES IN CLOSE PROXIMITY

(71) Applicant: Cummins Inc., Columbus, IN (US)

(72) Inventor: Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 189 days.

(21) Appl. No.: 17/293,530

(22) PCT Filed: Jan. 13, 2020

(86) PCT No.: PCT/US2020/013364
§ 371 (c)(1),
(2) Date: May 13, 2021

(87) PCT Pub. No.: WO2020/150155
PCT Pub. Date: Jul. 23, 2020

(65) Prior Publication Data
US 2022/0024330 A1 Jan. 27, 2022

Related U.S. Application Data

(60) Provisional application No. 62/792,281, filed on Jan. 14, 2019.

(51) Int. Cl.
*B60L 53/00* (2019.01)
*B60L 53/57* (2019.01)
(Continued)

(52) U.S. Cl.
CPC ............... *B60L 53/57* (2019.02); *B60L 53/14* (2019.02); *B60L 53/53* (2019.02); *B60L 53/66* (2019.02); *B60L 58/12* (2019.02); *B60L 2240/62* (2013.01)

(58) Field of Classification Search
CPC .......... B60L 53/14; B60L 53/57; B60L 53/53; B60L 53/66; B60L 58/12; B60L 2240/62; B60L 2240/622; Y02T 90/16; Y02T 90/12
See application file for complete search history.

(56) References Cited

U.S. PATENT DOCUMENTS

| 4,334,819 | A | 6/1982 | Hammerslag |
| 4,983,903 | A | 1/1991 | Bae et al. |

(Continued)

FOREIGN PATENT DOCUMENTS

| AU | 2008264146 A1 * | 7/2009 | .......... B60L 11/1818 |
| CN | 103097175 A | 5/2013 | |

(Continued)

OTHER PUBLICATIONS

International Search Report and Written Opinion on International Application No. PCT/US2020/013364, dated May 28, 2020, 11 pages.

(Continued)

*Primary Examiner* — Naum Levin
(74) *Attorney, Agent, or Firm* — Foley & Lardner LLP

(57) ABSTRACT

Systems and apparatuses include a vehicle controller and a mobile battery charging device. The vehicle controller is engaged with a vehicle that includes a battery charging port coupled to a vehicle battery system. The controller is configured to communicate information indicative of a state of charge of a battery of the vehicle over a network. The mobile a battery charging device includes a drive system configured to propel the battery charging device, a charging interface configured to engage the battery charging port of the vehicle, and a controller. The controller is configured to receive the information of the state of charge of the battery system of the vehicle, determine a position of the vehicle, and command the drive system to move the battery charging device to align (Continued)

the charging interface with the battery charging port of the vehicle to charge the battery system of the vehicle.

16 Claims, 5 Drawing Sheets

(51) Int. Cl.
    *B60L 53/53*               (2019.01)
    *B60L 53/14*               (2019.01)
    *B60L 53/66*               (2019.01)
    *B60L 58/12*               (2019.01)

(56) References Cited

U.S. PATENT DOCUMENTS

| | | | |
|---|---|---|---|
| 5,187,423 A | 2/1993 | Marton | |
| 7,999,506 B1 | 8/2011 | Hollar et al. | |
| 8,290,657 B2 | 10/2012 | Lavoie | |
| 9,056,555 B1 * | 6/2015 | Zhou | B60L 53/35 |
| 9,187,004 B1 | 11/2015 | Davis | |
| 9,505,308 B2 * | 11/2016 | Kyoung | B60L 3/12 |
| 9,592,742 B1 | 3/2017 | Sosinov et al. | |
| 9,744,870 B2 | 8/2017 | Cronie | |
| 9,770,993 B2 * | 9/2017 | Zhao | B60L 53/51 |
| 9,778,653 B1 | 10/2017 | McClintock et al. | |
| 11,220,190 B2 * | 1/2022 | Schütz | B60L 53/31 |
| 11,358,484 B2 * | 6/2022 | Lee | B60L 53/16 |
| 2008/0086247 A1 | 4/2008 | Gu et al. | |
| 2010/0060093 A1 | 3/2010 | Hunter | |
| 2010/0207772 A1 * | 8/2010 | Yamamoto | B60L 53/14 |
| | | | 340/636.2 |
| 2011/0221387 A1 | 9/2011 | Steigerwald et al. | |
| 2011/0225105 A1 * | 9/2011 | Scholer | G06Q 50/06 |
| | | | 320/109 |
| 2012/0005031 A1 * | 1/2012 | Jammer | B60L 53/30 |
| | | | 705/16 |
| 2012/0185379 A1 | 7/2012 | Tu | |
| 2013/0076902 A1 * | 3/2013 | Gao | B60L 53/31 |
| | | | 348/148 |
| 2013/0238162 A1 * | 9/2013 | Kobayashi | G06F 17/10 |
| | | | 701/1 |
| 2014/0089064 A1 | 3/2014 | Hyde et al. | |
| 2015/0134167 A1 | 5/2015 | Won et al. | |
| 2015/0149221 A1 * | 5/2015 | Tremblay | G06F 3/04842 |
| | | | 320/109 |
| 2016/0129793 A1 | 5/2016 | Cronie | |
| 2016/0352113 A1 * | 12/2016 | Zhao | B60L 53/14 |
| 2017/0140349 A1 | 5/2017 | Ricci | |
| 2019/0016331 A1 * | 1/2019 | Carlson | G05D 1/0088 |
| 2019/0126757 A1 * | 5/2019 | Kagawa | B60L 3/0046 |
| 2019/0135125 A1 * | 5/2019 | Sponheimer | B60L 58/30 |
| 2019/0315236 A1 * | 10/2019 | Mere | H02J 7/342 |
| 2019/0381910 A1 * | 12/2019 | Akhavan-Tafti | B60L 53/65 |

FOREIGN PATENT DOCUMENTS

| | | | | |
|---|---|---|---|---|
| CN | 106183843 A | * | 12/2016 | B25J 11/00 |
| CN | 107657374 A | * | 2/2018 | G06F 30/18 |
| CN | 108149980 A | * | 6/2018 | |
| CN | 109064772 A | * | 12/2018 | G08G 1/14 |
| CN | 109664812 A | * | 4/2019 | B60L 15/20 |
| CN | 111224418 A | * | 6/2020 | H02J 3/32 |
| CN | 108448188 B | * | 9/2020 | B60L 53/00 |
| CN | 211899921 U | * | 11/2020 | E04H 6/422 |
| EP | 2181884 A1 | * | 5/2010 | B60L 53/00 |
| ES | 2697328 T3 | * | 1/2019 | B60L 53/60 |
| GB | 2460500 A | * | 12/2009 | B60L 11/1818 |
| JP | H11-285109 A | | 10/1999 | |
| JP | 2014016324 A | * | 1/2014 | B60L 11/1816 |
| JP | 5678258 B2 | * | 2/2015 | |
| JP | 2020112519 A | * | 7/2020 | |
| WO | WO-2014091619 A1 | * | 6/2014 | B60K 6/46 |
| WO | WO-2014/175569 | | 10/2014 | |
| WO | WO-2019163209 A1 | * | 8/2019 | B60L 15/20 |

OTHER PUBLICATIONS

Supplementary European Search Report issued for European Patent Application No. 20741012.7 dated Jun. 29, 2022, 36 pages.
China 1st Office Action dated Apr. 12, 2023 re CN Appl 202080006234.0 with English translation.

* cited by examiner

SYSTEMS, APPARATUSES, AND METHODS FOR CHARGING MULTIPLE VEHICLES IN CLOSE PROXIMITY

CROSS-REFERENCE TO RELATED APPLICATION

This application claims priority to U.S. Provisional Patent Application No. 62/792,281, filed on Jan. 14, 2019, which is incorporated herein by reference in its entirety.

TECHNICAL FIELD

The present disclosure relates to charging batteries of electric and/or hybrid vehicles. More particularly, the present disclosure relates to systems and methods for charging vehicles that are part of a fleet of electric and/or hybrid vehicles.

BACKGROUND

Individual vehicles that are part of a fleet of vehicles can be charged at a vehicle charging facility during periods of low vehicle demand. Charging each of the vehicles within a fleet of electric vehicles can be complex. In order to meet the charging needs of the fleet, the vehicle charging facility may have a vehicle charging station for each of the vehicles, which can cause the vehicle charging facility to have large current draws. Alternatively, the vehicle charging facility can have a limited number of vehicle charging stations. Each of the vehicles can be driven to one of the charging stations for battery charging and be driven away from the charging station when battery charging is complete. This process can be complex and requires humans to drive the vehicles to and from the charging stations.

SUMMARY

One embodiment relates to an apparatus. The apparatus includes a vehicle controller and a mobile battery charging device. The controller is structured to communicate information indicative of a status of the battery system of the vehicle over a network. The mobile battery charging device includes a drive system, a charging interface, and a mobile battery charging device controller. The drive system is structured to propel the mobile battery charging device. The charging interface is structured to engage the battery charging port of the vehicle. The mobile battery charging device controller is structured to: receive the information of the state of charge of the battery system of the vehicle; determine a position of the vehicle; and command the drive system to move the mobile battery charging device to engage the charging interface with the battery charging port of the vehicle to charge the battery system of the vehicle.

In some embodiments, the drive system is structured to propel the battery charging device along a mounted track. In some embodiments, the vehicle is parked such that the charging port of the vehicle is in proximity of the overhead track.

Another embodiment relates to an apparatus. The apparatus includes a drive system, a charging interface, and a controller. The drive system is structured to propel a mobile battery charging device. The charging interface is structured to engage a charging port of a vehicle that is one of a fleet of vehicles. The controller is structured to: receive information indicative of a status of a battery system of each vehicle of the fleet of vehicles; determine a charging priority for each of the vehicles; determine a location of the vehicle having the battery system with a highest charging priority; and command the drive system to move the battery charging device to engage the charging interface with the charging port of the vehicle having the battery with the highest charging priority and to charge the battery of the vehicle.

In some embodiments, the controller is structured to determine the charging priority based on at least one of a state of charge of the battery system, an amount of charge required for the battery system to complete the upcoming mission, and a charging time of the battery system.

In some embodiments, the drive system is structured to propel the battery charging device along a mounted track. In some embodiments, the vehicle is parked in proximity of the track.

Another embodiment relates to a method. The method includes receiving, by a controller, information indicative of a status of a battery system of each vehicle of a fleet of vehicles. The status of the battery system includes one or more of a state of charge (SOC) of the battery system, an amount of charge required for the battery system to complete an upcoming mission, and a charging time of the battery system. The method includes determining, by the controller, a charging priority for each of the vehicles. The method includes determining, by the controller, a location of the vehicle having the battery system with a highest charging priority. The method includes commanding, by the controller, a drive system of a mobile battery charging device to move the battery charging device to engage the charging interface with the charging port of the vehicle having the battery with the highest charging priority and to charge the battery of the vehicle.

These and other features, together with the organization and manner of operation thereof, will become apparent from the following detailed description when taken in conjunction with the accompanying drawings.

DETAILED DESCRIPTION

Figure 1:
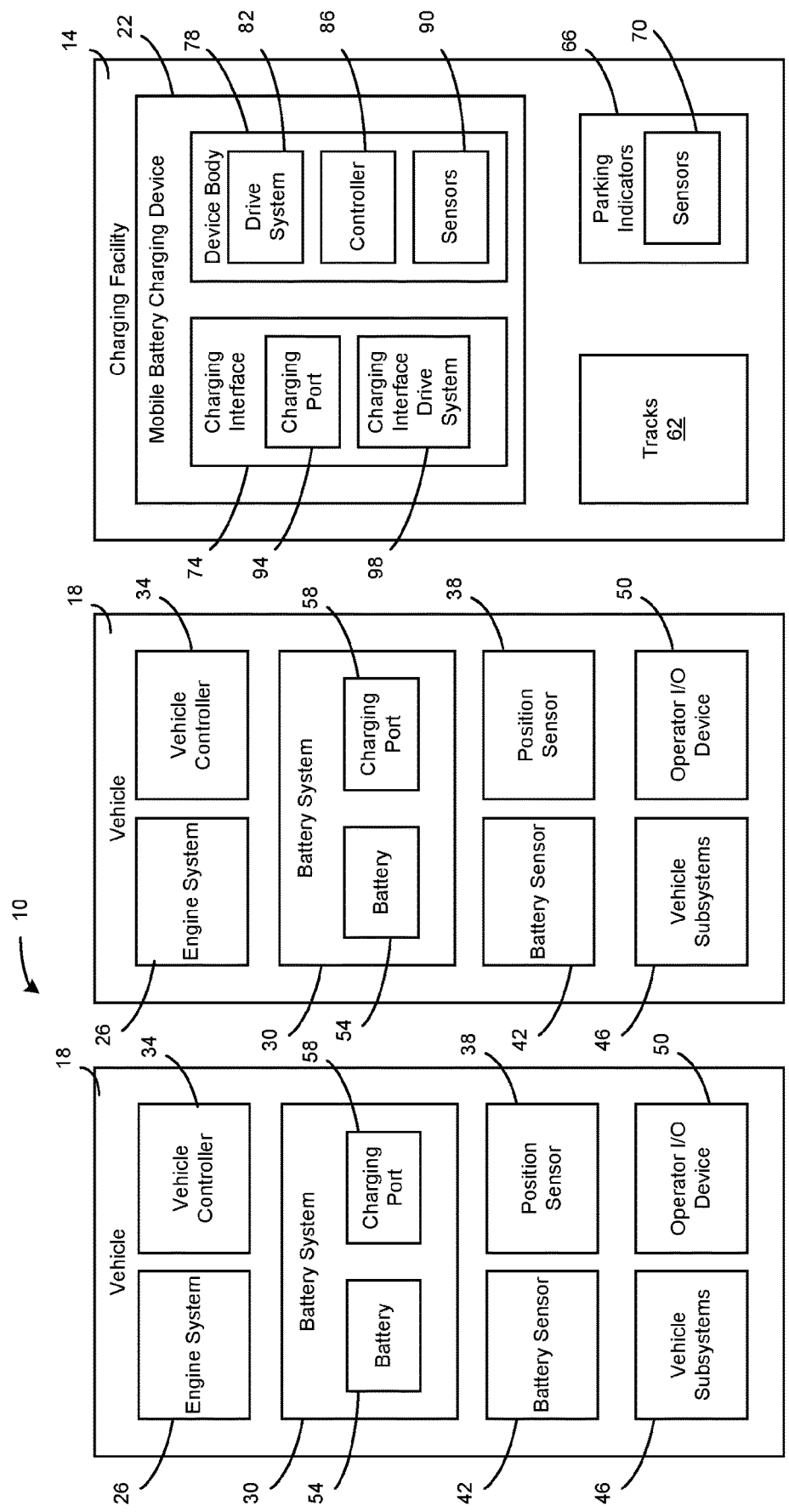
FIG. 1 is a schematic representation of a fleet of vehicles and a charging facility including a mobile battery charging device according to an example embodiment.

Following below are more detailed descriptions of various concepts related to, and implementations of, methods, apparatuses, and systems for charging the batteries of a fleet of electric vehicles, hybrid vehicles, or a combination of electric and hybrid vehicles. The methods, apparatuses, and systems can include a mobile battery charging device that can sequentially charge the batteries of multiple vehicles during a charging time period. The various concepts introduced above and discussed in greater detail below may be implemented in any number of ways, as the concepts described are not limited to any particular manner of implementation. Examples of specific implementations and applications are provided primarily for illustrative purposes.

The systems, apparatuses, and methods of the present disclosure include a mobile battery charging device that can sequentially charge the batteries of multiple vehicles belonging to a fleet of vehicles during a charging time period. In the illustrated embodiments, the charging time period is longer than an amount of time required to charge all of the batteries of the vehicles belonging to the fleet of vehicles. The fleet of vehicles is charged at a charging facility.

In the illustrated embodiments, each of the vehicles includes at least a vehicle controller and a battery charging port coupled to a battery system of the vehicle. The vehicle controller is configured to communicate information indicative of a state of charge (SOC) of a battery or a battery system of the vehicle over a network. A mobile battery charging device within the charging facility can receive the information indicative of the state of charge of the battery system of the vehicle over the network. The mobile battery charging device includes a drive system configured to propel the battery charging device, a charging interface configured to engage the battery charging port of the vehicle, and a controller. The controller is configured to receive the information indicative of the state of charge of the battery system of the vehicle, determine a position of the vehicle, and command the drive system to move the battery charging device to align the charging interface with the battery charging port of the vehicle to charge the battery system of the vehicle.

In the illustrated embodiments, the charging facility includes parking indicators to assist the operator(s) of the vehicles belonging to the fleet of vehicles to park the vehicles in positions that allow the vehicles to be charged by the mobile battery charging device. In some embodiments, the mobile battery charging device charges the battery systems of the vehicles based on an order in which the vehicles are parked along a path defined by the parking indicators. As the mobile battery charging device approaches a next vehicle along the path, the mobile battery charging device can receive information indicative of the SOC of the battery system and/or an amount of charge required for the vehicle to complete its next mission. The mobile battery charging device charges the battery system of the vehicle according to the SOC and/or the amount of charge required for the vehicle to complete its next mission.

In some embodiments, the mobile battery charging device can receive information indicative of the SOC and/or an amount of charge required for the vehicle to complete its next mission from each of the vehicles belonging to the fleet of vehicles. The mobile battery charging device can determine a priority structure for charging the vehicles based on the SOC each of the battery systems of the vehicles, the amount of charge required for each of the vehicles to complete its upcoming mission, and/or a charging time for each of the battery systems of the vehicles. The mobile battery charging device then charges the battery systems of the vehicles according to the priority structure.

Referring to the figures generally, the various embodiments disclosed herein relate to systems, apparatuses, and methods for charging a fleet of vehicles with a mobile charging device including positioning the vehicles so that the vehicles can be accessed by the mobile charging device, transmitting information indicative of the state of charge (SOC) of the battery systems of the each of the vehicles to mobile charging device, and charging each of the vehicles with the mobile charging device.

FIG. 1 illustrates a fleet of vehicles 10 and a charging facility 14 according to an example embodiment. The fleet of vehicles 10 includes a plurality of vehicles 18 that can include electric vehicles, hybrid vehicles, or a combination of electric and hybrid vehicles. In some embodiments, the fleet of vehicles 10 can include busses, cars (e.g., rental cars, taxis, ridesharing cars, delivery cars, etc.), line-haul trucks, mid-range trucks (e.g., delivery trucks, pickup trucks, etc.), and refuse vehicle trucks. The fleet of vehicles 10 is deployed for missions and then returns to the charging facility 14. In some embodiments, the missions can include a predetermined time period, a prescheduled route, or a schedule of routes that each vehicle 18 may follow (e.g., city/regional bus routes, school bus routes, delivery routes, etc.). In some embodiments, the missions can be scheduled on an on-demand basis, such that the vehicles 18 travel route(s) scheduled on-demand and return the charging facility 14 after a predetermined time period or after the route(s) have been completed.

The charging facility 14 includes a mobile battery charging device 22 that can charge the plurality of vehicles 18 during a long parking session in which the available charging time is less than an amount of time required for the mobile battery charging device 22 to charge all of vehicles 18 in the fleet of vehicles 10. For example, the fleet of vehicles 10 can be deployed on missions during the day and return to the charging facility 14 at the end of the day and be parked in the charging facility 14 overnight.

As shown in FIG. 1, each of the vehicles 18 includes an engine system 26, a battery system 30, a vehicle controller 34, position sensors 38, battery sensors 42, vehicle subsystems 46, and an operator input/output (I/O) device 50. The battery system 30 is structured to provide power to the engine system 26 and the vehicle subsystems 46. The battery system 30 includes at least one battery 54 and a charging port 58 coupled to the at last one battery 54. The charging port 58 is structured for engagement with the mobile battery charging device 22. In some embodiments, the charging port 58 can include at least one conductive element mounted on the vehicle 18 that can engage a pantograph. In embodiments in which the pantograph is mounted above the vehicle 18, the charging port 58 can be positioned on or proximate a roof of the vehicle 18. In other embodiments, the charging port 58 can include a socket structured to receive a plug.

The vehicle subsystems 46 may include components including electrically driven vehicle components (e.g., HVAC system, lights, pumps, fans, etc.). The vehicle subsystems 46 may also include any powered component used to reduce exhaust emissions or to monitor components used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

As shown in FIG. 1, the charging facility 14 includes the mobile battery charging device 22. In some embodiments, the charging facility 14 may include a system of tracks 62 on which the mobile battery charging device 22 can travel. In some embodiments, the system of tracks 62 are overhead-mounted tracks. The system of tracks 62 can define a path of the mobile battery charging device 22 from a starting point to an ending point. The charging facility 14 can include a plurality of parking indicators 66 indicating where operators should park the vehicles 18 such that the charging ports 58 of each of the vehicles 18 are positioned to engage the mobile battery charging device 22. In some embodiments, the parking indicators 66 can include a stripe or other indicator painted on a floor of the charging facility. In some embodiments, the parking indicators 66 are positioned to facilitate parking the vehicles 18 in one or more lines in a side-by-side and/or an end-to-end configuration. The parking indicators 66 can define a path of the mobile battery charging device 22 from a starting point to an ending point. In some embodiments, the parking indicators 66 can include sensors 70 that can sense a position of the vehicle 18 and communicate with the vehicle controller 34 over the network to provide information indicative of the vehicle 18 position to the vehicle controller 34. For example, the sensors 70 can include a proximity and/or a weight sensor structured to communicate wirelessly with the controller of the vehicle 18. As is described in greater detail below, the vehicle controller 34 can be structured to receive information indicative of a position of the vehicle 18 from the parking indicators 66. The vehicle controller 34 can be structured to send a notification to an operator of the vehicle 18 in response to determining, based on the information indicative of the position of the vehicle 18, that the vehicle 18 is correctly positioned for battery charging.

The mobile battery charging device 22 includes a charging interface 74 and a device body 78. The device body 78 includes a drive system 82, a mobile battery charging device controller 86, and sensors 90. The charging interface 74 is coupled to an electric power grid through the charging facility 14 (e.g., via electric wiring within the charging facility 14). The charging interface 74 includes a charging port 94 and charging interface drive system 98 such that the charging interface 74 is movable relative to the device body 78. The charging interface drive system 98 is structured to position the charging interface 74 and the charging port 94 of the mobile battery charging device 22 proximate the charging ports 58 on the vehicles 18. The charging port 94 is structured to engage the charging ports 58 of the vehicles 18. In the illustrated embodiment, the charging interface drive system 98 is structured to extend and retract the charging interface 74. In other embodiments, the charging interface drive system 98 can be structured to perform other types of motions (e.g., diagonal and/or rotational motion). In some embodiments, the charging interface 74 is a fast-charging device such as a pantograph. The tips of the pantograph that are structured to engage the charging port 58 (e.g., one or more conductive elements such as rails, rods, etc.) of the vehicle 18 form the charging port 94. In embodiments in which the charging interface 74 is a pantograph mounted to the system of tracks 62, the pantograph can extend to engage conductive the element positioned on or proximate a roof of each of the vehicles 18 without requiring human intervention. The pantograph can transmit electricity to the conductive element to charge the battery system 30 on the vehicle 18. In other embodiments, the charging interface 74 can be an extendible structure and the charging port 58 can be a plug.

The drive system 82 is structured to move the mobile battery charging device 22 along the fleet of vehicles 10 to charge each of the vehicles 18 parked within the charging facility 14. In embodiments in which the charging facility 14 includes the system of tracks 62, the drive system 82 can include a plurality of wheels and a motor structured to travel along the tracks 62. In other embodiments in which the charging facility includes the plurality of tracks 62, the plurality of tracks 62 and the drive system 82 can form a conveyor system. In locations in which the charging facility 14 does not include the plurality of tracks 62, the drive system 82 can include a plurality of wheels and a motor structured to travel along the ground.

The sensors 90 can be positioned on the device body 78, the charging interface 74, or a combination of the device body 78 and the charging interface 74. The sensors 90 can be structured to detect a position of the vehicles 18, the charging ports 58, or both the position of the vehicles 18 and the charging ports 58. As described in greater detail below, the mobile battery charging device controller 86 is structured to receive information indicative of the position of the vehicle 18 and/or the charging ports 58 and position the charging interface 74 so that the charging interface 74 can engage the charging port 94 with the charging port 58 of the vehicle 18.

Components of the vehicle 18 and the mobile battery charging device 22 may communicate with each other or components of other devices using any type and any number of wired or wireless connections. For example, a wired connection may include a serial cable, a fiber optic cable, a CATS cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the vehicle controller 34 is communicably coupled to the systems and components in the vehicle 18 of FIG. 1, the vehicle controller 34 is structured to receive data regarding one or more of the components shown in the vehicles 18 in FIG. 1. For example, the data may include operation data regarding the battery system 30, a position of the vehicle 18, etc. acquired by one or more sensors, such as the sensors 38, 42. As another example, the data may include an output to the operator I/O device 50. As an example, the vehicle controller 34 may output a notification through the operator I/O device 50 to the operator of the vehicle 18 indicating that the vehicle 18 is correctly positioned for charging. The vehicle controller 34 is structured to communicate with the mobile battery charging device controller 86. For example, the vehicle controller 34 may send information indicative of a health of the battery system 30, information indicative of a location of the vehicle 18, and information indicative of an identity of the vehicle 18 to the mobile battery charging device controller 86. The function and structure of the vehicle controller 34 is described in greater detail in FIG. 2.

The sensors 38, 42 may be positioned and/or structured to monitor characteristics of various components of the vehicle 18. The position sensor 38 is structured to facilitate monitoring the position of the vehicle 18 within the charging facility 14. The battery sensor 42 is structured to facilitate determining a state of charge (SOC) of the battery 54. In embodiments in which the battery system 30 includes more than one battery 54, the battery system 30 may include more than one battery sensor 42.

Because the mobile battery charging device controller 86 is communicably coupled to the systems and components in the mobile battery charging device 22 of FIG. 1, the mobile battery charging device controller 86 is structured to receive data regarding one or more of the components shown in the mobile battery charging device 22 in FIG. 1. For example, the data may include a position of the mobile battery charging device 22, a position of the charging interface 74 and/or the charging port 94, etc. acquired by one or more sensors, such as the sensors 90. The mobile battery charging device controller 86 is structured to communicate with the controllers 34 of each of the vehicles 18. For example, the mobile battery charging device controller 86 may receive information indicative of a health of the battery system 30, a location of the vehicle 18, and information indicative of an identity of the vehicle 18 from one or more of the vehicle controllers 34. The function and structure of the mobile battery charging device controller 86 is described in greater detail in FIG. 3.

The sensors 90 may be positioned and/or structured to monitor operating characteristics of various components of the mobile battery charging device 22. The sensors 90 may include a first position sensor structured to facilitate monitoring the position of the mobile battery charging device 22. The sensors 90 may include a second position sensor structured to facilitate determining a position of the charging interface 74 and/or the charging port 58 relative to the device body 78.

Figure 2:
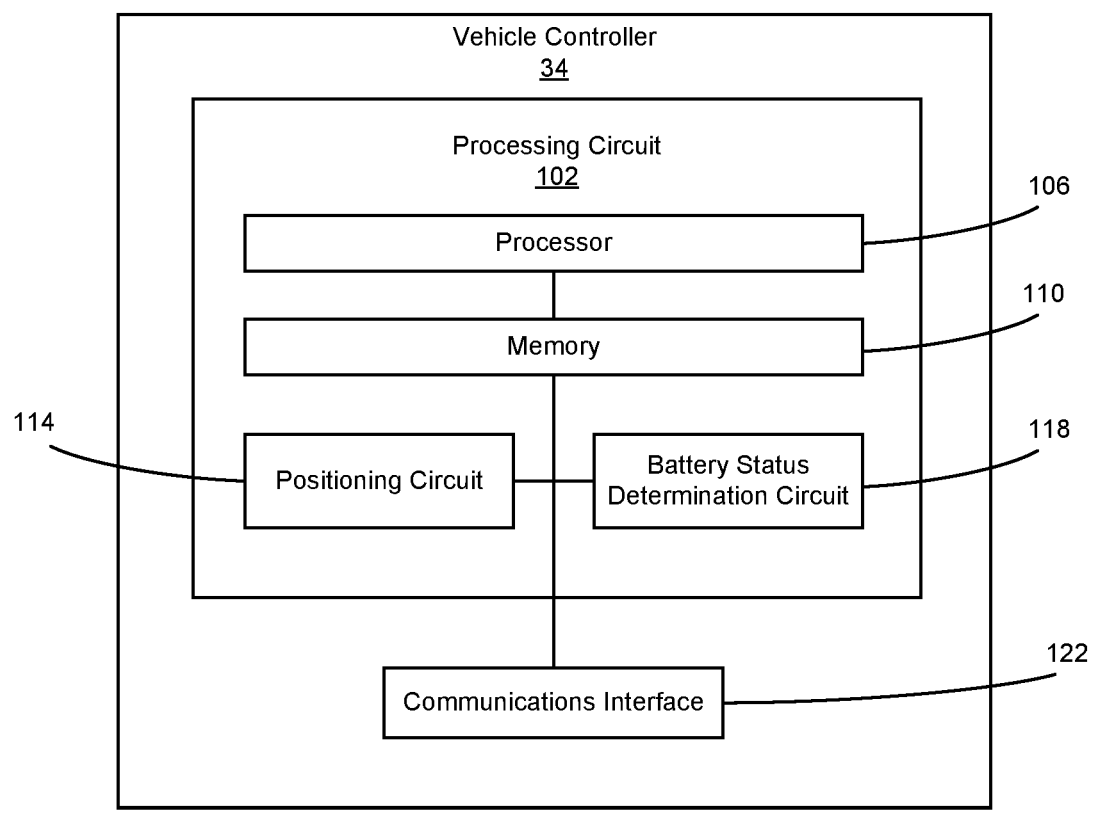
FIG. 2 is a schematic representation of a controller of a vehicle of the fleet of vehicles of FIG. 1 according to an example embodiment.

Referring now to FIG. 2, a schematic diagram of the vehicle controller 34 of each of the vehicles 18 the fleet of vehicles 10 of FIG. 1 is shown according to an example embodiment. As shown in FIG. 2, the vehicle controller 34 includes a processing circuit 102 having a processor 106 and a memory device 110, a positioning circuit 114, a battery status determination circuit 118, and a communications interface 122. Generally, the vehicle controller 34 is structured to determine the SOC of the battery or batteries 54 in the battery system 30, determine a SOC of the battery system 30, and send a battery status of the battery system 30 to the mobile battery charging device 22, and facilitate correct positioning of the vehicle 18 for charging. The battery status of the battery system 30 includes one or more of the SOC of the battery system 30, an amount of charge required for the battery system 30 to complete upcoming mission, and a charging time of the battery system 30.

Figure 3:
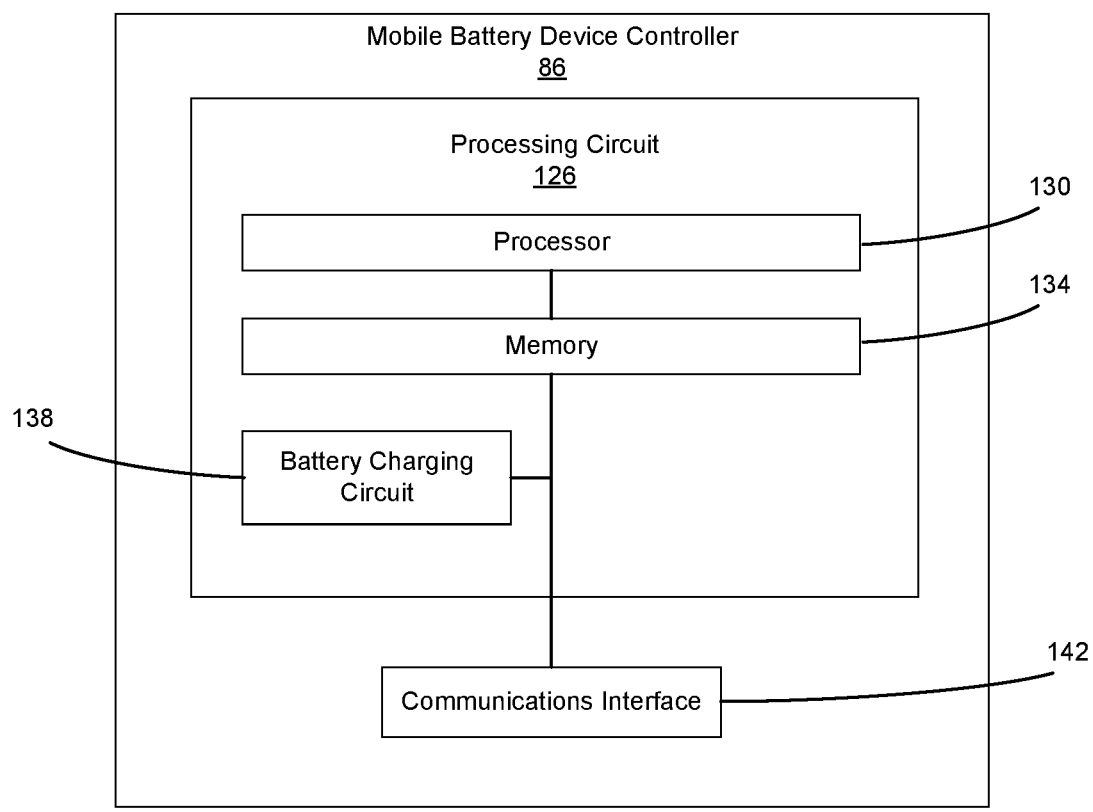
FIG. 3 is a schematic representation of a controller of the mobile battery charging device of FIG. 1 according to an example embodiment.

Referring now to FIG. 3, a schematic diagram of the controller 86 of the mobile battery charging device 22 of FIG. 1 is shown according to an example embodiment. As shown in FIG. 3, the mobile battery charging device controller 86 includes a processing circuit 126 having a processor 130 and a memory device 134, a battery charging circuit 138 and a communications interface 142. Generally, the mobile battery charging device controller 86 is structured to receive, from each of the vehicles 18, information indicative of an identity of the vehicle 18, information indicative of a position of the vehicle 18, information indicative of a status of the battery system 30 of the vehicle 18, and control the mobile battery charging device 22 to travel to the vehicle 18 and charge the battery system 30 of the vehicle 18. The battery status of the battery system 30 includes one or more of the SOC of the battery system 30, an amount of charge required for the battery system 30 to complete upcoming mission, and a charging time of the battery system 30. In some embodiments, the mobile battery charging device controller 86 is structured to determine a charging priority for each of the vehicles 18 based on the battery status (e.g., SOC of the battery system 30 of each vehicle 18, the amount of battery charge required for the next mission of each vehicle 18, and/or a charging time for the battery system 30) of each of the vehicles 18. The mobile battery charging device controller 86 is structured to determine the priority structure based on the charging priorities of each of the vehicles 18. The mobile battery charging device controller 86 is structured to control the mobile battery charging device 22 to travel to the vehicles 18 and charge the vehicles 18 according to the priority structure. In some embodiments, the mobile battery charging device controller 86 is also structured to receive an amount of battery charge required for an upcoming mission of the vehicle 18. In such an embodiment, the mobile battery charging device controller 86 is structured to determine the priority structure based on the charging priorities of each of the vehicles 18.

In one configuration, the positioning circuit 114, the battery status determination circuit 118, and the battery charging circuit 138 are embodied as machine or computer-readable media that is executable by a processor, such as processor 106 or processor 130. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the positioning circuit 114, the battery status determination circuit 118, and the battery charging circuit 138 are embodied as hardware units, such as electronic control units. As such, the positioning circuit 114, the battery status determination circuit 118, and the battery charging circuit 138 may be embodied as one or more circuitry components including, but not limited to, processing circuitry, network interfaces, peripheral devices, input devices, output devices, sensors, etc. In some embodiments, the positioning circuit 114, the battery status determination circuit 118, and the battery charging circuit 138 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the positioning circuit 114, the battery status determination circuit 118, and the battery charging circuit 138 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The positioning circuit 114, the battery status determination circuit 118, and the battery charging circuit 138 may also include programmable hardware devices such as field programmable gate arrays, programmable array logic, programmable logic devices or the like. The positioning circuit 114, the battery status determination circuit 118, and the battery charging circuit 138 may include one or more memory devices for storing instructions that are executable by the processor(s) of the positioning circuit 114, the battery status determination circuit 118, and the battery charging circuit 138. The one or more memory devices and processor(s) may have the same definition as provided herein with respect to the memory device 110 and processor 106 or the memory device 134 and processor 130. In some hardware unit configurations, the positioning circuit 114, the battery status determination circuit 118, and the battery charging circuit 138 may be geographically dispersed throughout separate locations in the vehicle and/or the mobile battery charging device 22. Alternatively and as shown, the positioning circuit 114, the battery status determination circuit 118, and the battery charging circuit 138 may be embodied in or within a single unit/housing, which is shown as the vehicle controller 34 and the mobile battery charging device controller 86.

In the example shown, the vehicle controller 34 includes the processing circuit 102 having the processor 106 and the memory device 110. The processing circuit 102 may be structured or configured to execute or implement the instructions, commands, and/or control processes described herein with respect to the positioning circuit 114 and the battery status determination circuit 118. The depicted configuration represents the positioning circuit 114 and the battery status determination circuit 118 as machine or computer-readable media. However, as mentioned above, this illustration is not meant to be limiting as the present disclosure contemplates other embodiments where the positioning circuit 114 and the battery status determination circuit 118 or at least one circuit of the positioning circuit 114 and the battery status determination circuit 118 is configured as a hardware unit. All such combinations and variations are intended to fall within the scope of the present disclosure.

In the example shown, the mobile battery charging device controller 86 includes the processing circuit 126 having the processor 130 and the memory device 134. The processing circuit 126 may be structured or configured- to execute or implement the instructions, commands, and/or control processes described herein with respect to the battery charging circuit 138. The depicted configuration represents the battery charging circuit 138 as machine or computer-readable media. However, as mentioned above, this illustration is not meant to be limiting as the present disclosure contemplates other embodiments where the battery charging circuit 138 is configured as a hardware unit. All such combinations and variations are intended to fall within the scope of the present disclosure.

The processors 106, 130 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the positioning circuit 114 and the battery status determination circuit 118) may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory devices 110, 134 (e.g., RAM, ROM, Flash Memory, hard disk storage, etc.) may store data and/or computer code for facilitating the various processes described herein. The memory devices 110, 134 may be communicably connected to the processors 106, 130, respectively, to provide computer code or instructions to the processor 68 for executing at least some of the processes described herein. Moreover, the memory devices 110, 134 may be or include tangible, non-transient volatile memory or non-volatile memory. Accordingly, the memory devices 110, 134 may include database components, object code components, script components, or any other type of information structure for supporting the various activities and information structures described herein.

The communications interfaces 122, 142 may include wired or wireless interfaces (e.g., jacks, antennas, transmitters, receivers, transceivers, wire terminals, etc.) for conducting data communications with various systems, devices, or networks. For example, the communications interfaces 122, 142 may include an Ethernet card and port for sending and receiving data via an Ethernet-based communications network and/or a Wi-Fi transceiver for communicating via a wireless communications network. The communications interfaces 122, 142 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 122 of the vehicle controller 34 may facilitate communication between and among the vehicle controller 34 and one or more components of the vehicle 18 (e.g., components of the battery system 30, the operator I/O device 50, the sensors 38,42, the parking indicators 66 etc.) and the mobile battery charging device controller 86. The communications interface 142 of the mobile battery charging device controller 86 may facilitate communication between and among the mobile battery charging device controller 86 and one or more components of the mobile battery charging device 22 (e.g., components of the drive system 82, the charging interface 74, the sensors 90, etc.), and the vehicle controller 34. Communication between and among the controllers 34, 86 and the components of the vehicle 18 or the mobile battery charging device 22, respectively, may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The positioning circuit 114 of the vehicle controller 34 is structured to receive information indicative of a position of the vehicle 18 from the sensors 38, 42 of the vehicle 18 or the sensors 70 of the parking indicators 66. The positioning circuit 114 is structured to determine a position of the vehicle 18 relative to the parking indicators 66 based on the information indicative of the position of the vehicle 18. In response to determining that the position of the vehicle 18 is acceptable, the positioning circuit 114 is structured to notify the operator that the vehicle 18 is in an acceptable position via the operator I/O device 50. In some embodiments, the notification may be a visual indication such as a light or a message on a dashboard of the vehicle 18. In some embodiments, the notification may be an auditory notification. In some embodiments, in response to determining that the position of the vehicle 18 is unacceptable, the positioning circuit 114 is structured to notify the operator that the vehicle 18 is in an unacceptable position via the operator I/O device 50. In some embodiments, the notification may be a visual indication such as a light or a message on a dashboard of the vehicle 18. In some embodiments, the notification may be an auditory notification. In some embodiments, the notification may include instructions for correctly positioning the vehicle 18. In some embodiments, in response to determining that the position of the vehicle 18 is unacceptable, the positioning circuit 114 is structured not to send any notifications to the operator of the vehicle 18 (e.g., the absence of the notification indicates that the vehicle 18 position is unacceptable).

The battery status determination circuit 118 of the vehicle controller 34 is structured to receive information indicative of the SOC of each of the one or more batteries 54 in the battery system 30 from the battery sensor(s) 90. The battery status determination circuit 118 is structured to determine the SOC of each of the one or more batteries 54. The battery status determination circuit 118 is structured to determine the SOC of the battery system 30 based on the SOCs of each of the one or more batteries 54. The battery status determination circuit 118 is structured to send the information indicative of the SOC battery system 30 to the mobile battery charging device controller 86. In some embodiments, the battery status determination circuit 118 is structured to predict an upcoming charge requirement of the battery system 30 based on an upcoming mission of the vehicle 18. For example, the battery status determination circuit 118 may be structured to retrieve each of the routes that will be travelled by the vehicle 18 on the next mission from the memory device 110. The battery status determination circuit 118 may be structured to determine the upcoming charge requirement based on the amount of battery charge required for the vehicle 18 to complete the upcoming mission. In some embodiments, the battery status determination circuit 118 is structured to consider on-route charging opportunities when determining the amount of battery charge required for the vehicle 18 to complete the upcoming mission. In some embodiments, the amount of charge can be a percentage of the total storage capacity of the battery system 30. In some embodiments, the battery status determination circuit 118 is structured to determine a charge time for the battery system 30. In some embodiments, the battery status determination circuit 118 is structured to determine the charge time based on the SOC of the battery system 30. In some embodiments, the battery status determination circuit 118 is structured to determine the charge time based on the SOCs and the upcoming charge requirements of the battery system 30. In some embodiments, the battery status determination circuit 118 is structured to consider on-route charging opportunities when determining the amount of battery charge required for the vehicle 18 to complete the upcoming mission.

The battery status determination circuit 118 is structured to send information indicative of the identity of the vehicle 18, the battery status of the battery system 30, the upcoming charge requirement, and/or the information indicative of the position of the vehicle 18 to the controller 86 of the mobile battery charging device 22.

During charging, the battery status determination circuit 118 can be structured to determine that the battery system 30 has been charged according to the upcoming charge requirement and/or has been fully charged based on information indicative of the SOC of the battery systems 30 received from the battery sensor(s) 42. The battery status determination circuit 118 can be structured to send a notification to the battery charging circuit 138 of the mobile battery charging device controller 86 indicating that the battery system 30 has been charged according to the upcoming charge requirement and/or fully charged.

In some embodiments, the battery charging circuit 138 is structured to charge the fleet of vehicles 10 in a sequential order based on the positions of the vehicles 18 in the charging facility 14. In such an embodiment, the mobile battery charging device 22 is structured to command the drive system 82 to follow a path from a starting point to an ending point and charge the battery systems 30 of the vehicles 18 as the mobile battery charging device 22 encounters each of the vehicles 18. In embodiments in which the drive system 82 is structured to travel along the system of mounted tracks 62, the system of mounted tracks 62 forms the path. In other embodiments, the mobile battery charging device controller 86 can be structured to determine the path based on the positions of parking indicators 66 or the path can be programmed into the memory device 134 of the mobile battery charging device 22. In some embodiments, the battery charging circuit 138 is structured to receive, for each of the vehicles 18, the information indicative of the identity of the vehicle 18 and the battery status of the battery system 30 of the vehicle 18 as the mobile battery charging device 22 approaches each vehicle 18. In some embodiments, the battery charging circuit 138 is structured to determine the amount of battery charge required for the upcoming mission from the vehicle 18. In some embodiments, the battery charging circuit 138 can be structured to retrieve each of the routes that will be travelled by the vehicle 18 on the next mission from the memory device 110 or another database. The battery charging circuit 138 may be structured to determine the upcoming charge requirement based on the amount of battery charge required for the vehicle 18 to complete the upcoming mission. In some embodiments, the battery charging circuit 118 may be structured to consider on-route charging opportunities in determining the amount of battery charge required for the vehicle 18 to complete the upcoming mission. In some embodiments, the amount of charge can be a percentage of the total storage capacity of the battery system 30.

The battery charging circuit 138 is structured to determine a relative position of the charging port 58 of the vehicle 18 and the mobile battery charging device 22 based on information received from the sensors 38, 90. The battery charging circuit 138 is structured to command the drive system 82 of the mobile battery charging device 22 to substantially align the mobile battery charging device 22 with the charging port 58 of the vehicle 18. The battery charging circuit 138 is then structured to command the charging device drive system 98 to position the charging interface 74 proximate the charging port 58 of the vehicle 18 and engage the charging port 94 of the mobile battery charging device 22 with the charging port 58 of the vehicle 18. The battery charging circuit 138 is structured to charge the battery system 30 of the vehicle 18 based on the battery status of the battery system 30. The battery charging circuit 138 can receive a notification from the battery status determination circuit 118 of the vehicle 18 indicating that the battery system 30 has been charged according to the upcoming charge requirement and/or has been fully charged. The battery charging circuit 138 is structured to command the charging interface drive system 98 to disengage the charging port 58 of the mobile battery charging device 22 from the charging port 58 of the vehicle 18. The battery charging circuit 138 is then structured to command the drive system 82 to approach the next vehicle 18 along the path.

In some embodiments, the battery charging circuit 138 is structured to determine a priority structure based on the battery statuses of the battery systems 30 of each of the vehicles 18. The battery charging circuit 138 is structured to receive the battery statuses of the battery system 30, the information indicative of the identity of the vehicle 18 before determining the priority structure. For example, the battery charging circuit 138 can be structured to command the drive system 82 to travel along the path from the starting point to the ending point and receive the battery statuses of the battery system 30 and the information indicative of the identity of the vehicle 18 from each of the vehicles 18 as the mobile battery charging device 22 passes proximate each of the vehicles 18. In another example, the battery charging circuit 138 is structured to receive the battery status of the battery system 30 and the information indicative of the identity of the vehicle 18 from each of the vehicles 18 as the vehicles 18 enter the charging facility 14 or park in the charging facility 14. In some embodiments, the battery charging circuit 138 is structured to determine a charge time for each of the battery systems 30 of the vehicles 18. In some embodiments, the battery charging circuit 138 is structured to determine the charge time based on the SOCs of the battery system 30 of each of the vehicles 18. In some embodiments, the battery charging circuit 138 is structured to determine the charge time based on the SOCs and the upcoming charge requirements of the battery system 30 of each of the vehicles 18. In some embodiments, the battery charging circuit 138 is structured to consider on-route charging opportunities when determining the amount of battery charge required for the vehicle 18 to complete the upcoming mission.

The battery charging circuit 138 is structured to determine the charging priority of each of the vehicles 18 based on the battery statuses (e.g., the SOCs of the battery systems 30 of each of the vehicles 18, the amount of battery system 30 charge required) for the each of the vehicles 18 to complete an upcoming mission, and/or the charge times for each of the vehicles 18. The battery charging circuit 138 is structured to determine the priority structure of the fleet of vehicles 10 based on the charging priorities of each of the vehicles 18. In some embodiments, the battery charging circuit 138 is structured to determine the priority structure so that the vehicles 18 having the battery systems 30 with the lowest SOC, the vehicles 18 having the battery systems 30 requiring the largest charge to complete the next upcoming mission, and/or the vehicles 18 having the battery systems 30 that require the longest charge time are charged first. In other embodiments, the battery charging circuit 138 is structured to determine the priority structure so that the vehicles 18 having the battery systems 30 with the highest SOC, the vehicles 18 having the battery systems 30 requiring the least charge to complete the next upcoming mission, and/or the vehicles 18 having the battery systems 30 that require the shortest charge time are charged first.

The battery charging circuit 138 is structured to retrieve the identity and location of the highest priority vehicle 18 in the priority structure. The battery charging circuit 138 is structured to command the drive system 82 to travel to the vehicle 18 having the highest priority. The battery charging circuit 138 is structured to charge the battery system 30 of the vehicle 18 as described above. The battery charging circuit 138 is structured to determine the identity of the vehicle 18 having the next highest priority according to the priority structure and travel to and charge the next highest priority vehicle 18 as described above until the battery systems 30 of all of the vehicles 18 in the fleet of vehicles 10 have been charged.

Figure 4:
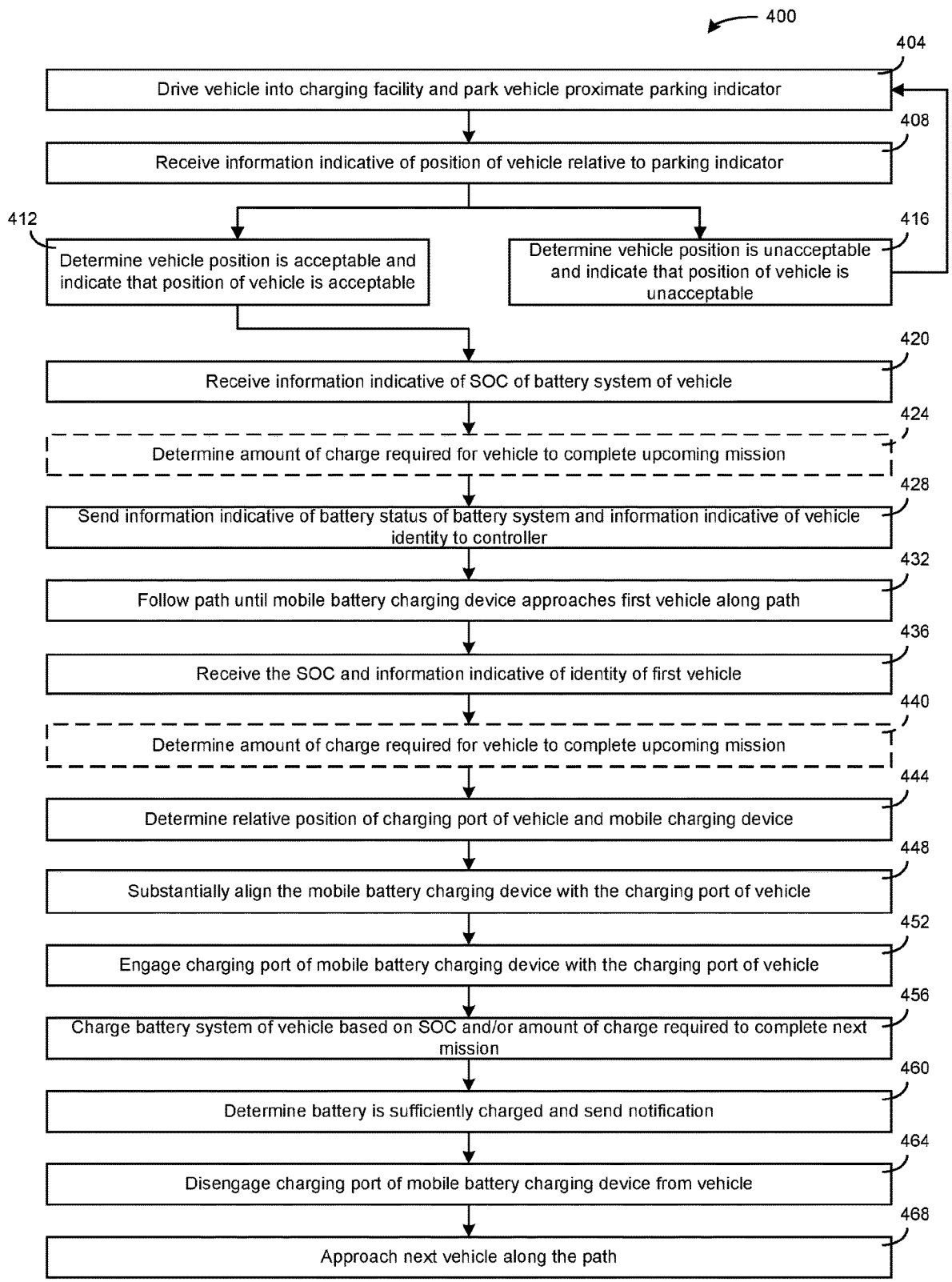
FIG. 4 is a flow diagram of a method for charging the fleet of vehicles with the mobile battery charging device according to an example embodiment.

FIG. 4 illustrates an exemplary method 400 for charging the fleet of vehicles 10 with the mobile battery charging device 22 to an example embodiment. At process 404, the operator drives one of the vehicles 18 of the fleet of vehicles 10 into the charging facility 14 and parks the vehicle 18 proximate one of the parking indicators 66. At process 408, the positioning circuit 114 receives information indicative of the position of the vehicle 18 relative to the parking indicators 66. For example, the positioning circuit 114 can receive the information indicative of the position of the vehicle 18 from the sensors 38 and/or the sensors 70. At process 412, in response to determining that the position of the vehicle 18 relative to the parking indicators 66 is acceptable, the positioning circuit 114 can notify the operator, via the operator I/O device 50, to indicate that the vehicle 18 position is acceptable. At process 416, in response to determining that the position of the vehicle 18 relative to the parking indicators 66 is unacceptable, the positioning circuit 114 can indicate that the position of the vehicle 18 relative to the parking indicators 66 is unacceptable. For example, the positioning circuit 114 can either not send a notification to the user (e.g., the absence of the notification indicates that the vehicle 18 position is unacceptable) or can send a notification to the operator via the operator I/O device 50 indicating that the vehicle 18 position is unacceptable. In some embodiments, the notification may provide instructions on how to reposition the vehicle 18.

At process 420, the battery status determination circuit 118 receives information indicative of the battery status of the battery system 30 of the vehicle 18. The information indicative of the SOC of each of the one or more batteries 54 can be determined by at least one battery sensor 90. The battery status determination circuit 118 can determine the SOC of the battery system 30 based on the SOCs of the one or more batteries 54. At process 424, the battery status determination circuit 118 may determine the amount of battery charge required for the vehicle 18 to complete the upcoming mission. For example, the battery status determination circuit 118 may retrieve information indicative of the upcoming mission from a networked device and determine the amount of battery charge required for the next mission based on a next route or schedule of routes for the mission and/or on-route charging opportunities during the mission. The battery status determination circuit 118 may also determine a charging time for the battery system 30 based on the amount of battery charge required for the next mission and the SOC of the battery system 30. At process 428, the battery status determination circuit 118 sends the information indicative of the status of the battery system 30 and information indicative of the identity of the vehicle 18 to the mobile battery charging device controller 86.

At process 432, the battery charging circuit 138 commands the drive system 82 of the mobile battery charging device 22 to follow the path until the mobile battery charging device 22 approaches a first vehicle 18 along the path. In embodiments in which the drive system 82 is structured to travel along the system of mounted tracks 62, the system of mounted tracks 62 forms the path. In other embodiments, the mobile battery charging device controller 86 can be structured to determine the path based on the parking indicators 66 or the path can be programmed into the memory device 134 of the mobile battery charging device 22. At process 436, the battery charging circuit 138 receives the battery status and information indicative of the identity of the vehicle 18. At process 440, the battery charging circuit 138 may determine the amount of battery charge required for the upcoming mission. In some embodiments, the battery charging circuit 138 may retrieve the amount of battery charge required for the upcoming mission from a database based on the information indicative of the identity of the vehicle 18. The battery charging circuit 138 may determine the amount of battery charge required for the upcoming mission based on the route or route(s) the vehicle 18 is scheduled to travel during the upcoming mission. The battery charging circuit 138 may also determine a charging time for the battery system 30 based on the amount of battery charge required for the next mission and the SOC of the battery system 30. At process 428, the battery charging circuit 138 sends the information indicative of the status of the battery system 30 and information indicative of the identity of the vehicle 18 to the mobile battery charging device controller 86.

At process 444, the battery charging circuit 138 determines a relative position of the charging port 58 of the vehicle 18 and the mobile battery charging device 22. At process 448, the battery charging circuit 138 commands the drive system 82 of the mobile battery charging device 22 to substantially align the mobile battery charging device 22 with the charging port 58 of the vehicle 18. At process 452, the battery charging circuit 138 commands the battery charging interface drive system 98 to position the charging interface 74 proximate the charging port 58 of the vehicle 18 and engage the charging port 94 of the charging interface 74 with the charging port 58 of the vehicle 18. At process 456, the battery charging circuit 138 charges the battery system 30 of the vehicle 18 based on the SOC of the battery system 30 and/or the charge requirement to complete the upcoming mission. At process 460, the battery status determination circuit 118 determines that the battery system 30 is sufficiently charged and sends a notification to the battery charging circuit 138. The battery status determination circuit 118 can determine that the battery system 30 is fully charged based on the information indicative of the SOC of the battery system 30 determined by the sensor(s) 42. At process 464, the battery charging circuit 138 commands the charging interface drive system 98 to disengage the charging port 94 of the charging interface 74 from the charging port 58 of the vehicle 18. At process 468, the battery charging circuit 138 commands the drive system 82 to approach the next vehicle 18 along the path.

Figure 5:
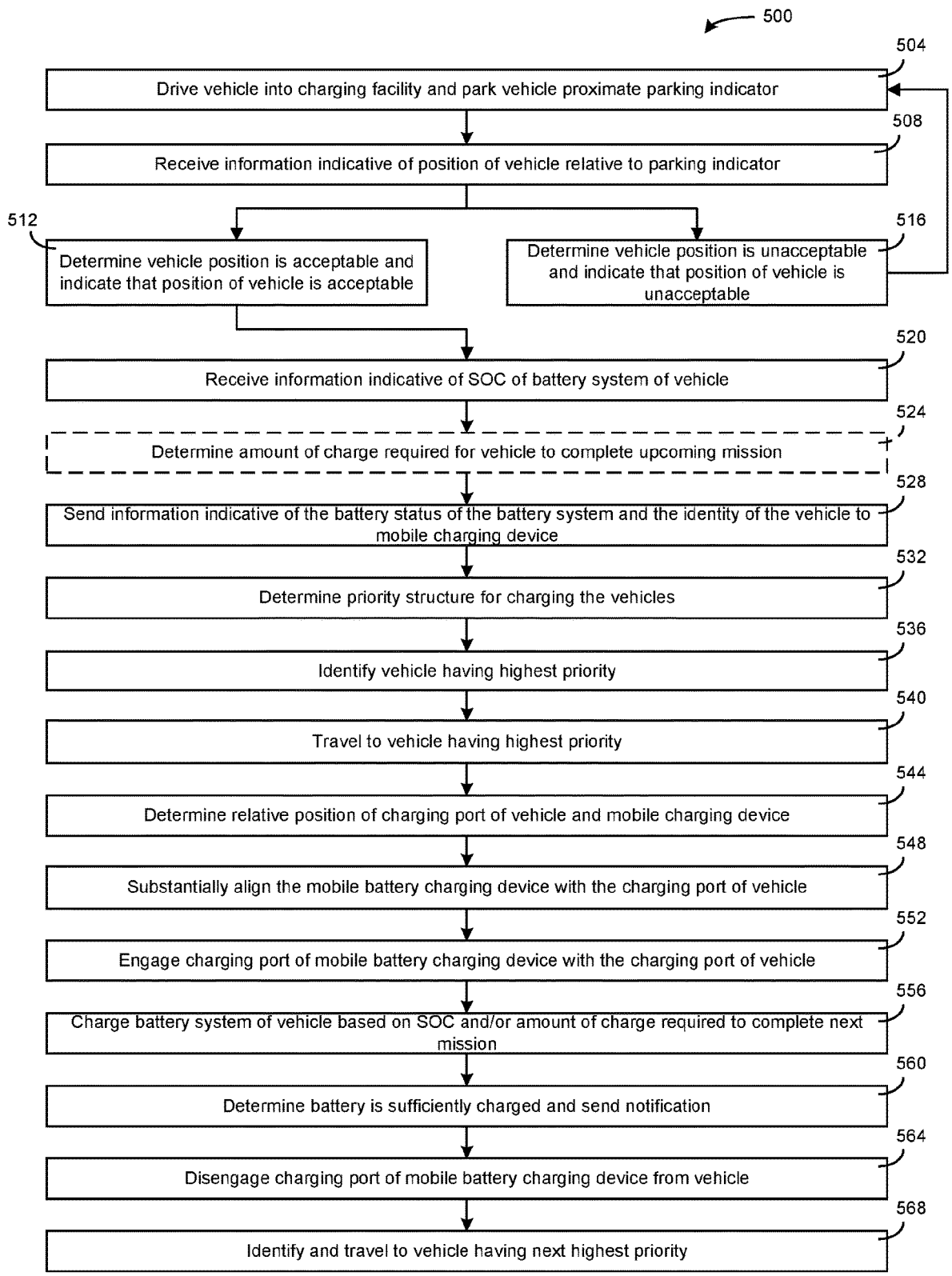
FIG. 5 is a flow diagram of a method for determining a priority structure for charging the fleet of vehicles with the mobile battery charging device and charging the fleet of vehicles with the mobile battery charging device according to the priority structure according to an example embodiment.

FIG. 5 is a flow diagram of a method 500 for determining a priority structure for charging the fleet of vehicles 10 with the mobile battery charging device 22 and charging the fleet of vehicles 10 with the mobile battery charging device 22 according to the priority structure according to an example embodiment. Processes 504-516 are substantially similar to processes 404-416 of the method 400. Processes 504-516 and are shown in FIG. 5 but are not discussed in detail herein for the sake of brevity.

At process 520, the battery status determination circuit 118 receives information indicative of the battery status of the battery system 30. The information indicative of the SOC of each of the one or more batteries 54 can be determined by at least one battery sensor 42. The battery status determination circuit 118 can determine the SOC of the battery system 30 based on the SOCs of the one or more batteries 54. At process 524, the battery status determination circuit 118 may determine the amount of battery charge required for the vehicle 18 to complete the upcoming mission. In some embodiments, the battery charging circuit 138 may retrieve the amount of battery charge required for the upcoming mission from a database based on the information indicative of the identity of the vehicle 18. The battery charging circuit 138 may determine the amount of battery charge required for the upcoming mission based on the route or route(s) the vehicle 18 is scheduled to travel during the upcoming mission. The battery status determination circuit 118 may also determine a charging time for the battery system 30 based on the amount of battery charge required for the next mission and the SOC of the battery system 30. At process 528, the battery status determination circuit 118 sends the information indicative of the status of the battery system 30 and information indicative of the identity of the vehicle 18 to the mobile battery charging device controller 86.

At process 532, the battery charging circuit 138 determines the priority structure for charging the vehicles 18 of the fleet of vehicles 10. In some embodiments, battery charging circuit 138 determines the priority structure based on the battery statuses (e.g., the SOCs of the battery systems 30, the amount of charge required for the battery system 30 to complete an upcoming mission, and a charge time of the battery systems 30) for each of the vehicles 18. At process 536, the battery charging circuit 138 is structured to identify the vehicle 18 having the highest priority. At process 540, the charging interface 74 commands the drive system 82 of the mobile battery charging device 22 to travel to the vehicle 18 having the highest priority.

At process 544, the battery charging circuit 138 determines a relative position of the charging port 58 of the vehicle 18 and the mobile battery charging device 22. At process 548, the battery charging circuit 138 commands the drive system 82 of the mobile battery charging device 22 to substantially align the mobile battery charging device 22 with the charging port 58 of the vehicle 18. At process 552, the battery charging circuit 138 commands the battery charging interface drive system 98 to position the charging interface 74 proximate the charging port 58 of the vehicle 18 and engage the charging port 94 of the charging interface 74 with the charging port 58 of the vehicle 18. At process 556, the battery charging circuit 138 charges the battery system 30 of the vehicle 18 based on the SOC of the battery system 30 and/or the charge requirement to complete the upcoming mission. At process 560, the battery status determination circuit 118 determines that the battery system 30 is sufficiently charged and sends a notification to the battery charging circuit 138. The battery status determination circuit 118 can determine that the battery system 30 is fully charged based on the information indicative of the SOC of the battery system 30 determined by the sensor(s) 42. At process 564, the battery charging circuit 138 commands the charging interface drive system 98 to disengage the charging port 94 of the mobile battery charging device 22 from the charging port 58 of the vehicle 18. At process 568, the battery charging circuit 138 identifies the vehicle 18 having the next highest priority. The battery charging circuit 138 commands the driving system to approach the next vehicle 18 having the next highest priority according to the priority structure.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIGS. 2 and 3, it should be understood that the vehicle controller 34 or the controller 86 of the mobile battery charging device 22 may include any number of circuits for completing the functions described herein. For example, the activities and functionalities of the circuits 114, 118, 122 may be combined in multiple circuits or as a single circuit. Additional circuits with additional functionality may also be included. Further, the controllers 34, 86 may further control other activity beyond the scope of the present disclosure.

As mentioned above and in one configuration, the "circuits" may be implemented in machine-readable medium for execution by various types of processors, such as the processor 106 of FIG. 2 and/or the processor 130 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a mobile battery charging device comprising:
     a drive system structured to propel the mobile battery charging device;
     a charging interface structured to engage a battery charging port of a vehicle of a plurality of vehicles, the battery charging port coupled to a battery system of the vehicle of the plurality of vehicles;
     a mobile battery charging device controller structured to:
       receive information indicative of a state of charge of each battery system of each vehicle in the plurality of vehicles and information indicative of an upcoming mission of each vehicle in the plurality of vehicles;
       receive information indicative of an amount of charge required for each vehicle in the plurality of vehicles to complete the upcoming mission;
       determine a priority structure for charging each vehicle in the plurality of vehicles based on the state of charge of each battery system of each vehicle in the plurality of vehicles and the upcoming mission of each vehicle in the plurality of vehicles;
       receive a position of each vehicle of the plurality of the plurality of vehicles;
       command the drive system to move the mobile battery charging device to engage the charging interface with the battery charging port of each vehicle of the plurality of vehicles to charge the battery system of each vehicle of the plurality of vehicles according to the determined priority structure;

receive a notification from a vehicle of the plurality of vehicles that the battery system of the vehicle has been charged to the amount of charge required for the vehicle to complete the upcoming mission that is different from a full charge level; and command the drive system to move the mobile battery charging device to engage with a subsequent vehicle of the plurality of vehicles from the vehicle according to the determined priority structure.

2. The apparatus of claim 1, wherein the controller is further structured to receive a status of the battery system, the status of the battery system includes a charging time of the battery system.

3. The apparatus of claim 1, wherein the drive system is structured to propel the mobile battery charging device along a mounted track, and wherein each vehicle is parked such that the battery charging port of each vehicle is in proximity of the mounted track.

4. The apparatus of claim 1, wherein the determined priority structure is further based on the position of each vehicle of the plurality of the plurality of vehicles.

5. The apparatus of claim 1, wherein the determined priority structure is further based on a status of each battery system of each vehicle in the plurality of vehicles.

6. The apparatus of claim 1, wherein each vehicle includes a vehicle controller that is structured to:

determine, based on the position of the vehicle relative to a parking indicator, that an associated vehicle with the vehicle controller is correctly positioned for battery charging; and notify an operator of the associated vehicle with the vehicle controller that the associated vehicle is correctly positioned for battery charging.

7. An apparatus comprising:

a drive system structured to propel a mobile battery charging device;

a charging interface structured to engage a charging port of each vehicle of a plurality of vehicles;

a controller structured to:

receive information indicative of a status of a battery system of each vehicle of the plurality of vehicles and an upcoming mission of each vehicle of the plurality of vehicles;

receive information indicative of an amount of charge required for each vehicle of the plurality of vehicles to complete the upcoming mission of each vehicle;

determine a charging priority for each vehicle of the plurality of vehicles based on the amount of charge required for the battery system of each vehicle of the plurality of vehicles to complete the upcoming mission;

receive a location of a vehicle having the battery system with a highest charging priority;

command the drive system to move the mobile battery charging device to engage the charging interface with the charging port of the vehicle having the battery with the highest charging priority to charge the battery system of the vehicle;

receive a notification form the vehicle having the battery system with the highest charging priority that the battery system has been charged to the amount of charge required for the battery system to complete the upcoming mission that is different from a full charge amount; and command the drive system of the mobile battery charging device to engage with a subsequent vehicle of the plurality of vehicles to charge a battery system of the subsequent vehicle according to the determined charging priority.

8. The apparatus of claim 7, wherein the status of the battery system includes a charging time of the battery system.

9. The apparatus of claim 7, wherein the charging priority is based on the status of each battery system of each vehicle of the plurality of vehicles.

10. The apparatus of claim 9, wherein the controller is structured to:

determine a priority structure based on the charging priorities of each vehicle of the plurality of vehicles so that an initial vehicle having the battery system with the highest SOC, requiring the least charge to complete the upcoming mission, and/or the shortest charge time is charged first.

11. The apparatus of claim 7, wherein the drive system is structured to propel the mobile battery charging device along a mounted track, and wherein each vehicle of the plurality of vehicles is parked in proximity of the mounted track.

12. A method, comprising:

receiving, by a controller, information indicative of a status of a battery system of each vehicle of a fleet of vehicles, the status of the battery system including one or more of a state of charge (SOC) of the battery system, an amount of charge required for the battery system to complete an upcoming mission, and a charging time of the battery system;

determining, by the controller, a charging priority for each vehicle of the fleet of vehicles based on the amount of charge required for the battery system to complete the upcoming mission;

receiving, by the controller, a location of a vehicle having the battery system with a highest charging priority; and commanding, by the controller, a drive system of a mobile battery charging device to move the mobile battery charging device to engage a charging interface of the mobile battery charging device with a charging port of the vehicle having the battery system with the highest charging priority to charge the battery system of the vehicle to the amount of charge required for the battery system to complete the upcoming mission;

receiving, by the controller, a notification from the vehicle having the battery system with the highest charging priority being charged to the amount of charge required for the battery system to complete the upcoming mission that is different from a full charge amount; and commanding, by the controller, the drive system of the mobile battery charging device to move to a subsequent vehicle of the fleet vehicles according to the charging priority.

13. The method of claim 12, wherein the charging priority is based on the status of each battery system of each of the vehicles in the fleet of vehicles.

14. The method of claim 13, wherein the method further includes:

determining, with the controller, a priority structure based on the charging priorities of each of the vehicles so that the vehicles having the battery systems with the lowest SOC, requiring the largest charge to complete the upcoming mission, and/or the longest charge time are charged first.

15. The method of claim 13, wherein the method further includes:

determining, with the controller, a priority structure based on the charging priorities of each of the vehicles so that the vehicles having the battery systems with the highest SOC, requiring the least charge to complete the upcoming mission, and/or the shortest charge time are charged first.

16. The method of claim 12, wherein the drive system is structured to propel the mobile battery charging device along a mounted track, and wherein each of the vehicles is parked in proximity of the mounted track.

* * * * *